(12) United States Patent
Ell et al.

(10) Patent No.: US 10,474,194 B1
(45) Date of Patent: Nov. 12, 2019

(54) WEARABLE ELECTRONIC DEVICE WITH AN INDUCTIVE USER INTERFACE

(71) Applicant: Garmin Switzerland GmbH, Schaffhausen (CH)

(72) Inventors: Jeremy J. Ell, Spring Hill, KS (US); Aaron J. Lindh, Overland Park, KS (US); Stephen M. Davis, Blue Springs, MO (US); Emily N. McKahan, Parkville, MO (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 16/262,294

(22) Filed: Jan. 30, 2019

(51) Int. Cl.
*G06F 1/16* (2006.01)
*H01F 38/14* (2006.01)

(52) U.S. Cl.
CPC ............ *G06F 1/1633* (2013.01); *G06F 1/163* (2013.01); *G06F 1/1656* (2013.01); *H01F 38/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,305,181 A | * | 4/1994 | Schultz | B60R 11/02 361/679.03 |
| 6,619,835 B2 | * | 9/2003 | Kita | A44C 5/0015 368/10 |
| 6,754,069 B2 | * | 6/2004 | Harada | G06F 1/1601 361/679.03 |
| 7,534,206 B1 | * | 5/2009 | Lovitt | A61B 5/02438 600/300 |
| 7,778,118 B2 | * | 8/2010 | Lyons | G04G 21/04 368/69 |
| 7,787,857 B2 | * | 8/2010 | Peterman | G01C 21/30 455/404.1 |
| 7,889,085 B2 | * | 2/2011 | Downey | A63B 24/0021 340/539.13 |

(Continued)

OTHER PUBLICATIONS

Fekete, Andras, *Implementation of a dive computer*. Master's Thesis and Capstones. University of New Hamphsire,512, https://scholars.unh.edu/thesis/512. 2009.

(Continued)

*Primary Examiner* — Lisa Lea-Edmonds
(74) *Attorney, Agent, or Firm* — Samuel M. Korte; Max M. Ali

(57) ABSTRACT

A wearable electronic device comprises a housing, a pushbutton, a sensor, and a processing element. The housing includes a sealed internal cavity formed in part by a bottom wall and a side wall. The pushbutton is coupled to an outer surface of the side wall and includes a plunger configured to move in relation to the side wall when the pushbutton is pushed. The sensor is positioned in the internal cavity adjacent to an inner surface of the side wall and includes a conductive element through which an electronic signal is operable to flow. The sensor is configured to modify an electrical characteristic of the electronic signal according to a distance between the plunger and the conductive element. The processing element is configured to receive the electronic signal from the sensor and to process the electronic signal to determine when the pushbutton is pushed.

20 Claims, 12 Drawing Sheets

(56) References Cited

U.S. PATENT DOCUMENTS

| | | | | |
|---|---|---|---|---|
| 8,638,229 B2* | 1/2014 | Downey | ............ | A63B 24/0021 |
| | | | | 340/539.13 |
| 8,705,234 B2* | 4/2014 | Schneider | ............... | A63F 9/001 |
| | | | | 361/679.02 |
| 8,773,847 B2* | 7/2014 | Byun | .................... | H04B 1/385 |
| | | | | 361/679.03 |
| 8,787,006 B2* | 7/2014 | Golko | .................... | G06F 1/163 |
| | | | | 361/679.03 |
| 9,801,587 B2* | 10/2017 | MacDonald | ....... | A61B 5/02416 |
| 9,835,457 B2* | 12/2017 | Morris | .................... | G06F 16/29 |
| 10,057,676 B2* | 8/2018 | Manning | ............ | G06F 16/5838 |
| 10,146,188 B2* | 12/2018 | Katzer | .................. | G04B 19/04 |
| 2011/0007468 A1* | 1/2011 | Burton | .................... | G04F 10/00 |
| | | | | 361/679.03 |
| 2014/0226270 A1* | 8/2014 | Holopainen | ............ | G06F 1/163 |
| | | | | 361/679.03 |
| 2014/0334083 A1* | 11/2014 | Bailey | .................... | G06F 1/163 |
| | | | | 361/679.03 |
| 2015/0223355 A1* | 8/2015 | Fleck | .................... | G06F 1/163 |
| | | | | 361/679.03 |
| 2015/0241916 A1* | 8/2015 | Choi | ....................... | G06F 1/163 |
| | | | | 361/679.03 |
| 2015/0241917 A1* | 8/2015 | Seok | ...................... | A61B 5/681 |
| | | | | 361/679.03 |
| 2015/0309535 A1* | 10/2015 | Connor | .................. | G06F 1/163 |
| | | | | 361/679.03 |
| 2015/0338880 A1* | 11/2015 | Sato | ......................... | G06F 1/163 |
| | | | | 361/679.03 |
| 2015/0346766 A1* | 12/2015 | Justice | .................... | G06F 1/163 |
| | | | | 361/679.03 |
| 2015/0346768 A1* | 12/2015 | Popalis | .................. | G06F 1/163 |
| | | | | 361/679.03 |
| 2016/0048159 A1* | 2/2016 | McCormack | .......... | G06F 1/163 |
| | | | | 361/679.03 |
| 2016/0070296 A1* | 3/2016 | Koo | ........................ | G06F 1/163 |
| | | | | 361/679.03 |
| 2016/0116940 A1* | 4/2016 | Jones | ...................... | G06F 1/163 |
| | | | | 361/679.03 |
| 2018/0173279 A1* | 6/2018 | Park | ........................ | G06F 1/163 |
| 2019/0166285 A1* | 5/2019 | Mistry | ................. | H04N 5/2252 |

OTHER PUBLICATIONS

Shearwater. *Teric Operating Instructions*. Sep. 2018.
Texas Instruments Incorporated. *Inductive Sensing—A Revolution in Sensing Worlds First Inductance-to-Digital Converter*. 2013.
Texas Instruments Incorporated. *LDC1000 Inductance-to-Digital Converter*. Sep. 2013 revised Sep. 2015.
Texas Instruments Incorporated. *LDLC0851 Differential Inductive Switch*. Jan. 2016.
Texas Instruments Incorporated. Obehauser, Chris, *LDC Sensor Design*; Mar. 2015 revised Apr. 2018.

\* cited by examiner

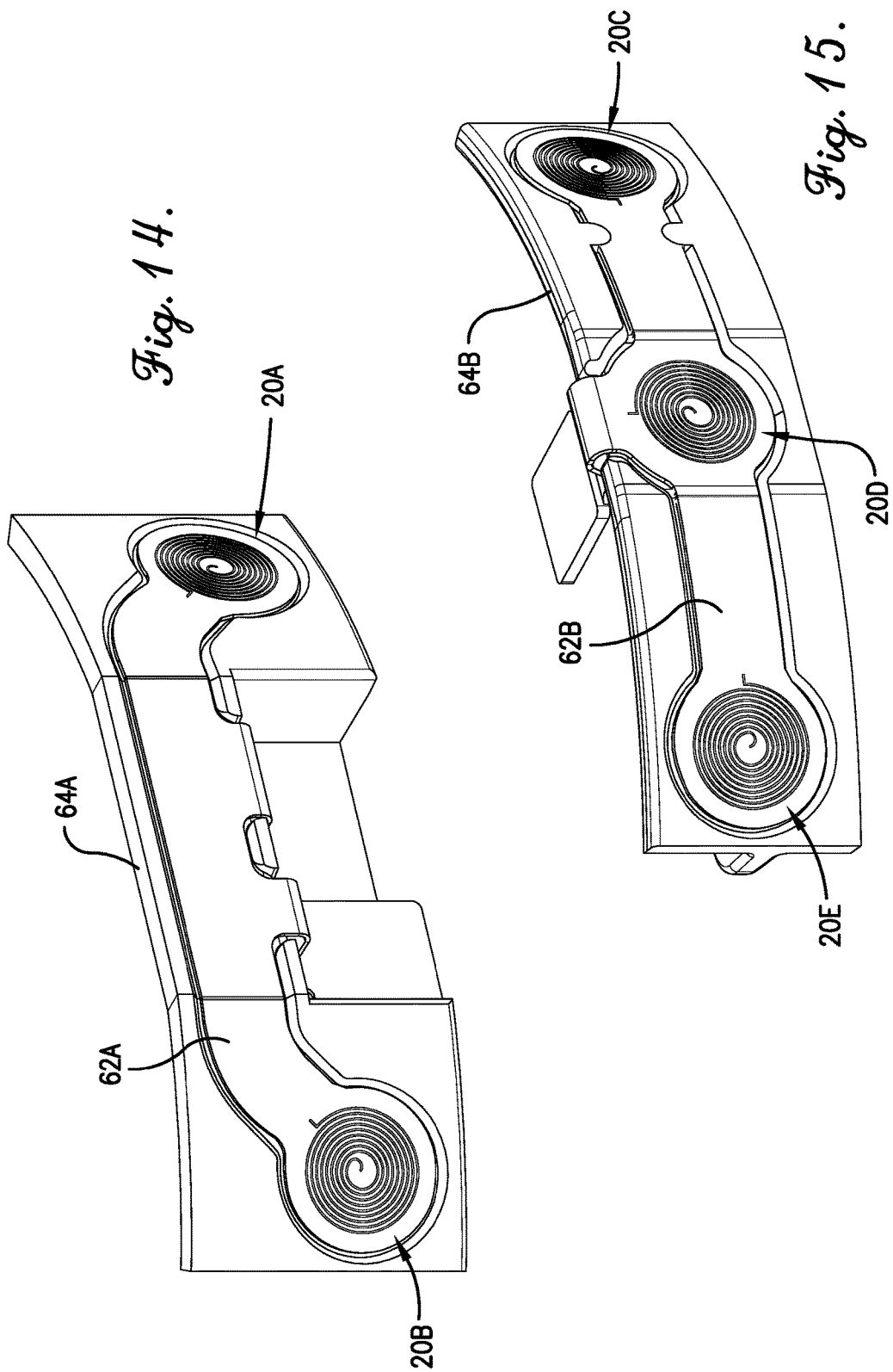

WEARABLE ELECTRONIC DEVICE WITH AN INDUCTIVE USER INTERFACE

BACKGROUND

Electronic devices that are worn on a user's wrist often include one or more pushbuttons. The pushbuttons may allow the user to navigate through functional menus, start and stop activities, initiate communication with the device such as uploading or downloading data, turn on a display light, and so forth. The pushbuttons may be particularly useful during underwater activities, such as scuba diving, when they allow the user to select a dive compass, a stopwatch, or gas switching.

SUMMARY

Embodiments of the present technology provide a wearable electronic device with an improved pushbutton configuration that is suitable for underwater activities. An embodiment of the wearable electronic device comprises a housing, a pushbutton, a sensor, and a processing element. The housing includes a bottom wall configured to contact a wearer's body, a side wall coupled to the bottom wall, and a sealed waterproof internal cavity formed in part by the bottom wall and the side wall. The pushbutton is coupled to an outer surface of the side wall and includes a plunger configured to move in relation to the side wall when the pushbutton is pushed. The sensor is positioned in the internal cavity adjacent to an inner surface of the side wall and includes a conductive element through which an electronic signal is operable to flow. The sensor is configured to modify an electrical characteristic of the electronic signal according to a distance between the plunger and the conductive element. The processing element is configured to receive the electronic signal from the sensor and to process the electronic signal to determine when the pushbutton is pushed.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 14 is a perspective view of a first frame of the wearable electronic device, the frame retaining a first substrate on which two sensors are implemented;

FIG. 15 is a perspective view of a second frame of the wearable electronic device, the frame retaining a second substrate on which three sensors are implemented.

Figure 2:
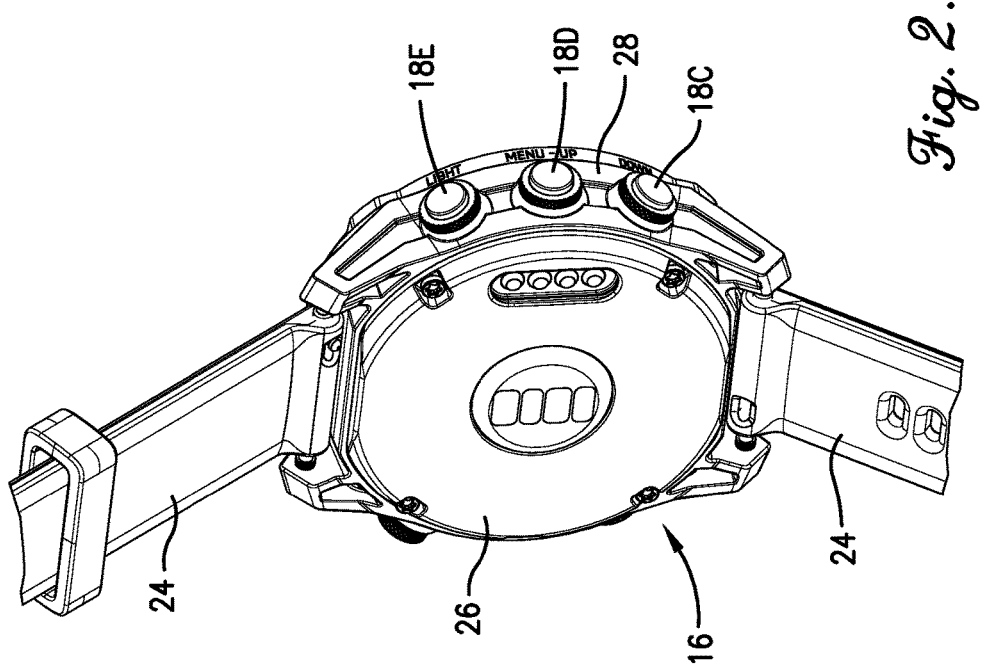
FIG. 2 is a rear perspective view of the wearable electronic device of FIG. 1.
Figure 1:
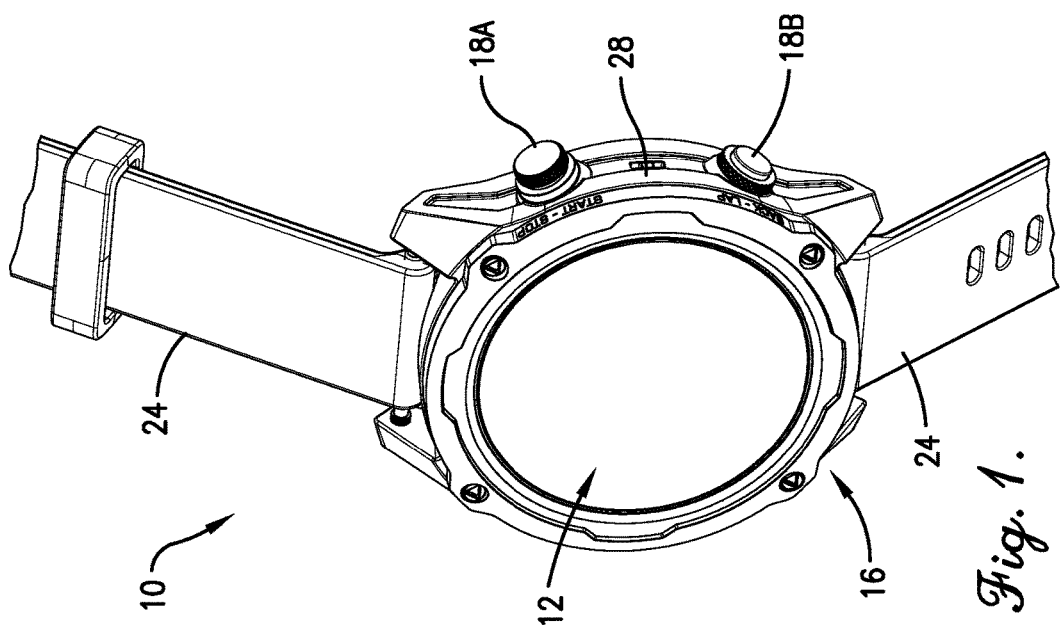
FIG. 1 is a front perspective view of a wearable electronic device, constructed in accordance with embodiments of the present technology, incorporating an improved pushbutton configuration, the wearable electronic device including a wrist band with a portion of the wrist band cut away.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to a wearable electronic device, in some configurations a "dive computer", which is intended for use with in-water and underwater activities such as swimming, snorkeling, and scuba diving. A user typically wears the electronic device on the user's wrist, although the electronic device may also be worn on other parts of the body, such as an upper portion of the arm, the leg, the chest, etc.

The wearable electronic device includes one or more pushbuttons which the user may push or press in order to navigate through functional menus, start and stop activities, select a dive compass, a stopwatch, or gas switching during a dive, initiate communication with the device such as uploading or downloading data, turn on a display light, and so forth. The wearable electronic device also includes a housing with a side wall on which the pushbuttons are mounted. In traditional implementations, each pushbutton is retained in one of a plurality of openings in the side wall. Although each opening is typically sealed with one or more O-rings, there is still a possibility that water may enter the housing through one of the openings—potentially causing an electrical short or corrosion of the internal components.

Possible solutions to this problem include utilizing hall sensors and permanent magnets to detect when a pushbutton has been pushed. However, wearable electronic devices for use with water-related activities typically include sensitive compasses to determine direction. The placement of permanent magnets in the vicinity of sensitive compasses diminishes the accuracy of the compasses. In addition, the magnets may corrode. Other solutions may include the use of capacitive touch technology for the pushbuttons. One drawback is that capacitive touch technology does not perform well in the presence of water.

Embodiments of the present technology provide a solution that eliminates openings in the housing for pushbuttons, resulting in a wearable electronic device with one or more pushbuttons that are sealed and/or waterproof. Furthermore, embodiments of the wearable electronic device offer reliable pushbutton operation—even when used underwater. The wearable electronic device can include a plurality of pushbuttons that are mounted on the side wall of the housing. The pushbuttons do not make or break electrical contact like prior art pushbuttons or otherwise penetrate the interior of the watch housing. Instead, each pushbutton includes an electrically-conductive plunger that travels in relation to an outer surface of the side wall when the pushbutton is pushed. Adjacent to an inner surface of the side wall, and generally aligned with the pushbutton in some configurations, is a sensor which senses the position of the plunger. An electrical characteristic of the sensor changes according to, or as a function of, a distance between the plunger and the sensor. Electronic circuitry detects the change in the electrical characteristic and determines that the pushbutton has been pushed.

Embodiments of the technology will now be described in more detail with reference to the drawing figures. Referring to FIGS. 1-16, a wearable electronic device 10 is illustrated. The wearable electronic device 10 can comprise a display 12, a vibration element 14, a housing 16, a plurality of pushbuttons 18, a plurality of sensors 20, and/or a processing element 22. The wearable electronic device 10 may also include a wrist band 24, a strap, or other attachment mechanisms.

Relational terms, such as "upper", "lower", "top", "bottom", "outer", "inner", etc., may be used throughout this description. These terms are used with reference to embodiments of the technology and the orientations thereof shown in the accompanying figures. Embodiments of the technology may be oriented in ways other than those shown in the figures. Therefore, the terms do not limit the scope of the present technology.

The display 12 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 12 may include a screen on which the information is presented, with the screen possessing a square or a rectangular aspect ratio that may be viewed in either a landscape or a portrait mode. In some embodiments, the display 12 may further include a lens overlying the viewing area, which may enhance the visibility of the information shown on the display 12. The display 12 may be integrated into a lens or bezel to form a display stack or be a discrete element positioned under a cover lens.

The vibration element 14 is coupled to the housing 16 and generally provides a vibrating motion. The vibrating motion is transferred to the housing 16 such that, when the electronic device 10 is worn by a user, the user feels the vibration. The vibration element 14 may include one or more mechanically vibrating components such as eccentric rotating mass motors, linear resonant actuators, and/or the like. The vibration element 14 provides the vibrating motion when it receives a vibration electronic signal. However, in configurations, the vibration element 14 is omitted and/or disabled as physical movement of the pushbuttons 18 can provide suitable tactile feedback to eliminate the need for vibrating motion.

Figure 3:
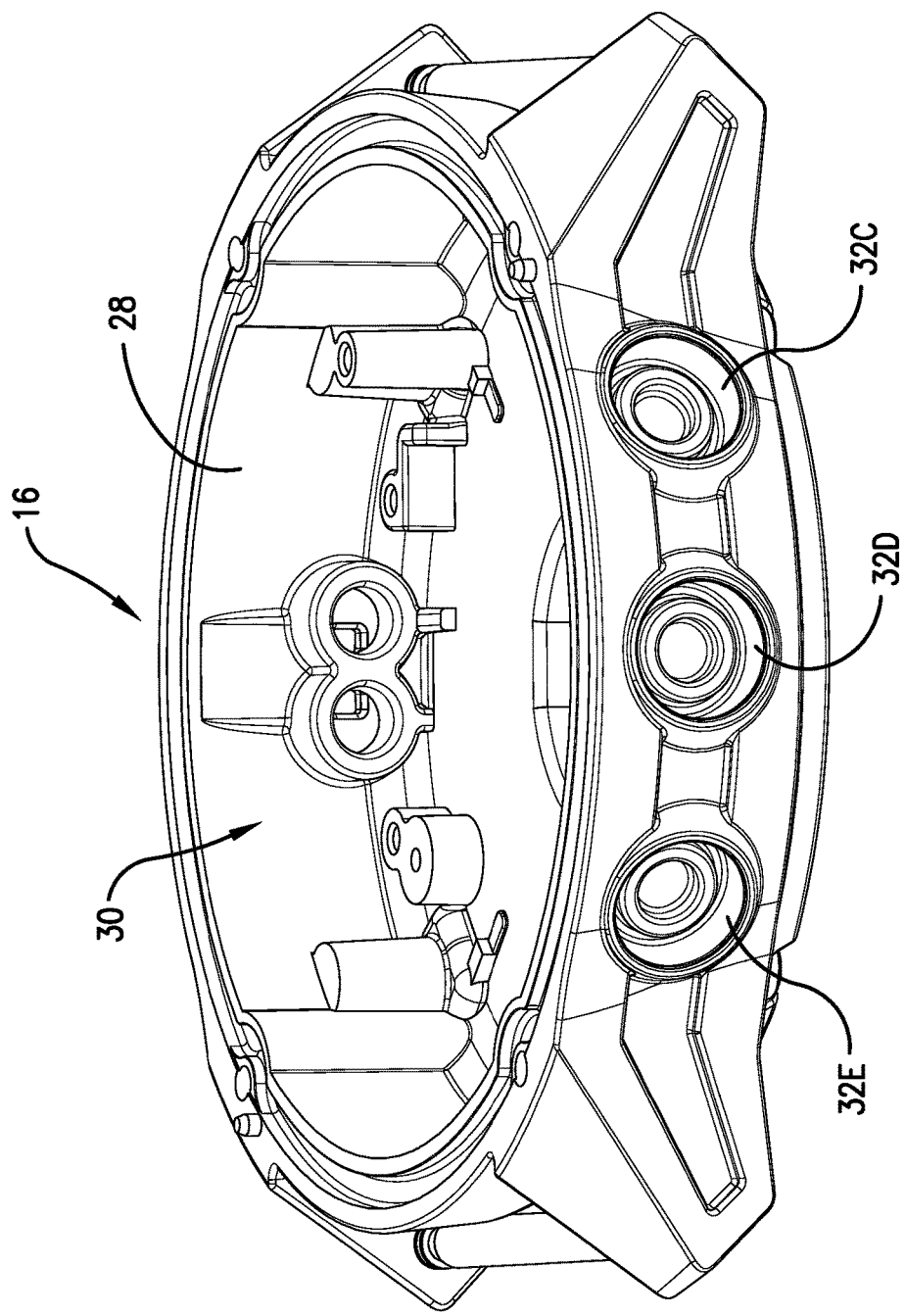
FIG. 3 is a first side perspective view of a housing of the wearable electronic device, the housing including a plurality of recesses in a side wall, each recess configured to retain one of a plurality of pushbuttons.
Figure 4:
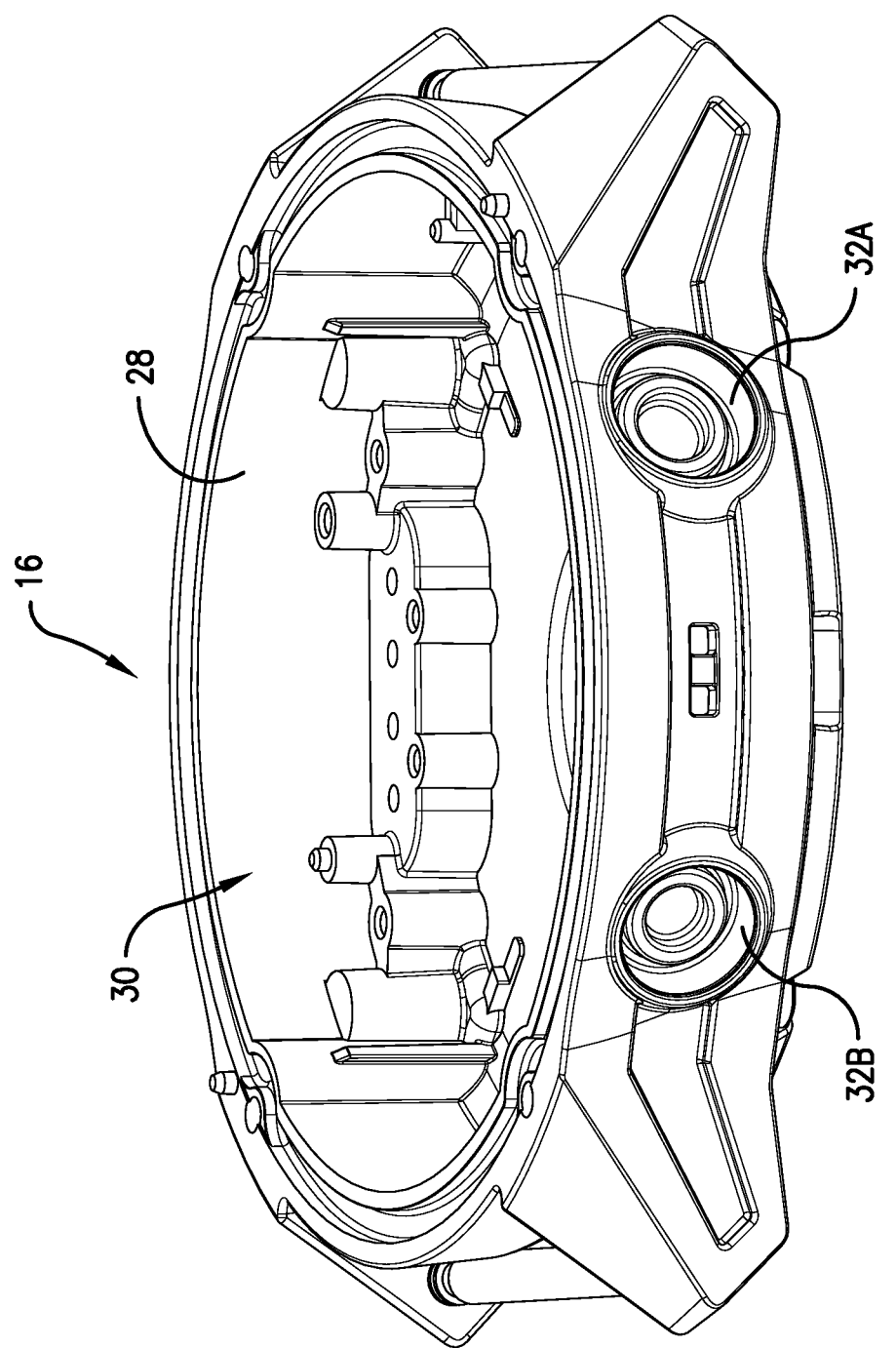
FIG. 4 is a second side perspective view of the housing, opposing the first side perspective view.
Figure 5:
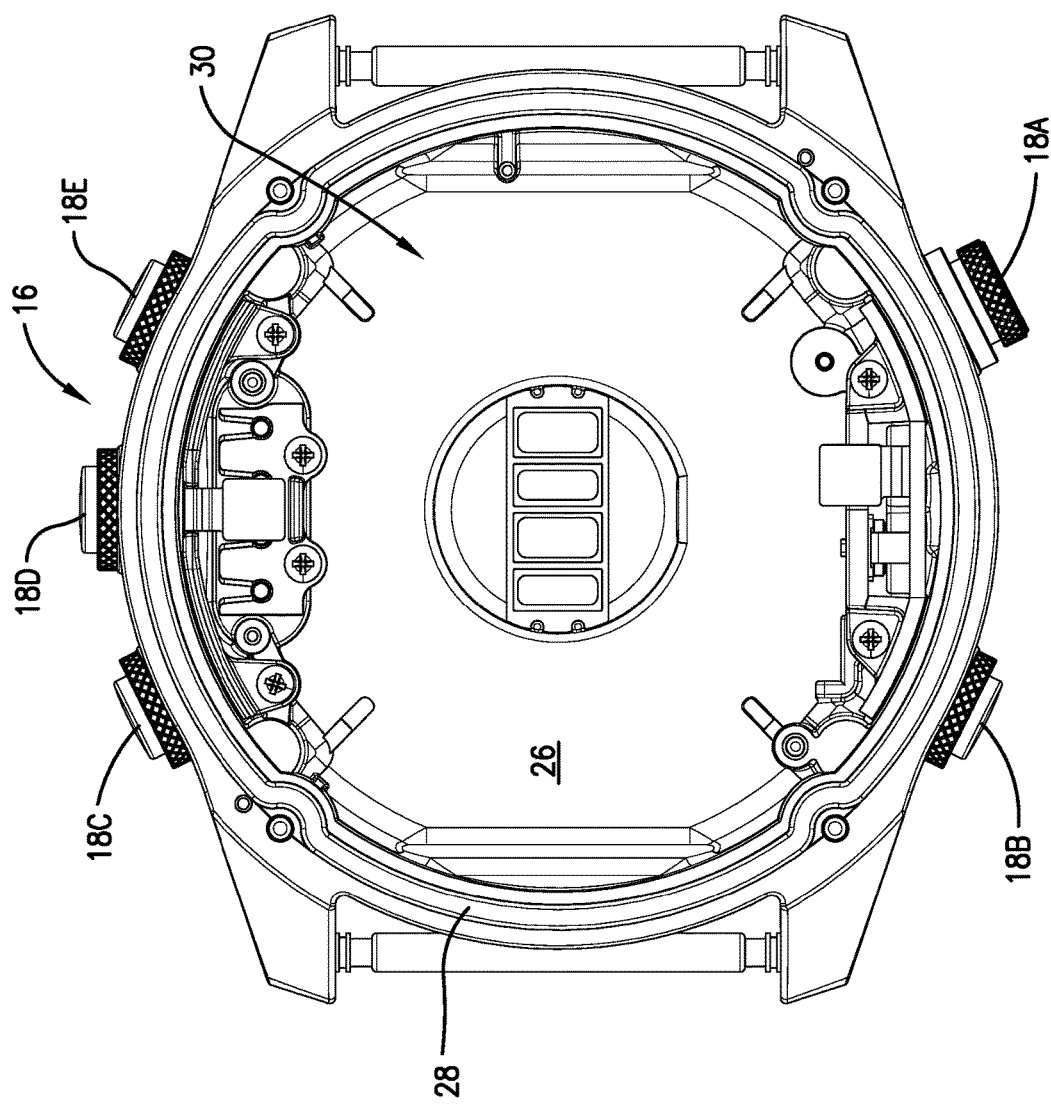
FIG. 5 is a top view of the wearable electronic device with a display removed to reveal an internal cavity of the housing.
Figure 6:
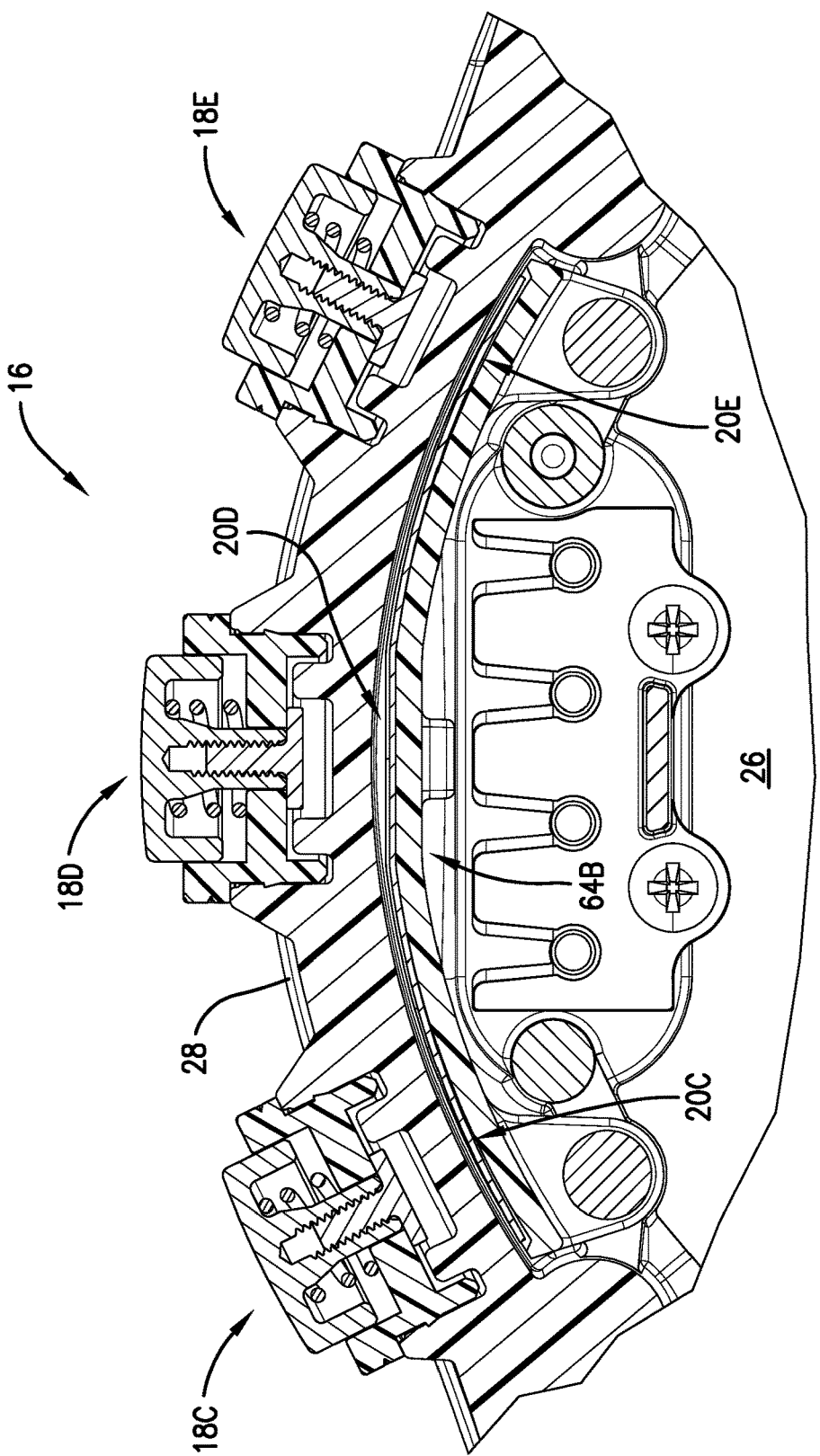
FIG. 6 is a sectional view of a portion of the wearable electronic device cut along a horizontal plane through the side wall of the housing in the area of three pushbuttons.

The housing 16, as shown in FIGS. 1-8, generally houses or retains other components of the electronic device 10 and may include or be coupled to the wrist band 24. The housing 16 may include a bottom wall 26, at least one side wall 28, and an internal cavity 30. The bottom wall 26 includes a lower, outer surface that contacts the user's body while the user is wearing the electronic device 10. The side wall 28 couples to the bottom wall 26 at a lower edge of the side wall 28. In exemplary embodiments that are shown in the figures, the housing 16 includes a single side wall 28, with inner and outer surfaces, that has a circular or ring shape which generally forms a hollow cylinder. In other embodiments, the side wall 28 may have an oval or elliptical shape. In still other embodiments, the housing 16 may include a plurality of side walls 28 which form one of a plurality of geometric or polygonal shapes, such as triangular, square or rectangular, hexagonal, octagonal, and so forth. The side wall 28 may have a certain thickness. In addition, the side wall 28 may include a plurality of spaced-apart recesses 32, as shown in FIGS. 3 and 4, each of which includes an opening on the outer surface that extends through a portion of the side wall thickness to the inner surface without penetrating the inner surface. In exemplary embodiments, the housing 16 includes five recesses 32A, 32B, 32C, 32D, 32E. Side wall 28 may form any portion of housing 16 and is not limited to particular sides or faces of housing 16. Thus, in configurations, side wall 28 may be used interchangeably herein with bottom wall 26 and positioned on the front, back, top, bottom, left, and/or right of housing 16. In embodiments where housing 16 is rectangular, for example, side walls 28 may comprise at least the front and top of housing 16.

The bottom wall 26 and the side wall 28 are each formed from rigid materials, such as hardened plastics, metals, composites, or the like. In embodiments, portions of the side wall 28 may be formed of non-conductive materials to provide a "window" through which button sensing may take place. The side wall 28 may include an upper surface, that is planar, to which the display 12 is attached. The bottom wall 26, the side wall 28, and the display 12 form the boundaries of the internal cavity 30. The bottom wall 26, the side wall 28, and the display 12 are coupled to one another such that the housing 16 is sealed and the internal cavity 30 is waterproof and/or air-tight. Recesses 32 do not breach the internal cavity 30 or otherwise impact its waterproofing configuration.

In configurations, the interval cavity 30 provides suitable waterproofing capabilities to enable the device 10 to be utilized in dive environments. For example, device 10 may have suitability for compliance with EN13319 (Diving accessories—Depth gauges and combined depth and time measuring devices), section 5.3.5, which requires subjecting the device 10 to water pressures up to 110% of rated device pressure for 200 cycles. Rated device pressures will typically be 10 ATM or greater. Device 10 may additionally or alternatively be compliant with ISO 6425 (Divers' watches), which requires overpressure in water up to 125% of rated pressure while the button 18 is subjected to a 5N side load (section 7.3.6). Beyond these standards, device 10 may enable button presses under water up to the maximum rated operation depth of the device (generally 10 ATM or more) over many button press cycles. Embodiments of the technology enable underwater button presses at depth without any movement of waterproofing seals or increased risk of water entry to the device.

Because the pushbuttons 18 do not penetrate the internal cavity 30, the pushbuttons 18 may fit within the recesses 32 using any mating configuration. That is, the mating configuration of the pushbuttons 18 to the recesses 32 does not provide waterproofing for the internal cavity 30, therefore the pushbuttons 18 may be retained within recesses 32 by snap fitting or other non-waterproof methods.

The pushbuttons 18, as shown in FIGS. 1, 2, and 5-11, generally allow the user to operate the wearable electronic device 10, and in combination, form at least a portion of a user interface. Each pushbutton 18 may include a body 34, a cap 36, a spring 38, and a plunger 40. In configurations, only cap 36 may be visible to a user of the device 10 while body 34, spring 38, and plunger 40 are not visible from outside of the housing 16. The body 34 may include a hollow cylindrical side wall 42 with an outer surface and an inner surface. An outward-extending flange 44 may be coupled to an upper edge of the outer surface of the side wall 42. However, the architecture of each pushbutton 18 can lack an external collar to keep common external appearance with more traditional button designs. A planar disc 46, with a central opening 48, may be coupled to an inner surface of the side wall 42 approximately midway along the length of the side wall 42. Although pushbuttons 18 are described herein in example environments, pushbuttons 18 may present any mechanical configuration that allows movement in relation to sensors 20. For instance, pushbuttons 18 may provide sliding and/or rotating movement instead of the "pushing" axial movement described in various example configurations of the present invention. Thus, for example, one or more pushbuttons 18 may be configured as a rotating bezel where one or more sensors 20 sense movement—and therefore position—of the bezel. Additionally or alternatively, one or more pushbuttons 18 may present a rectangular shape that is connected via a hinge for non-axial movement towards the sensor 20.

The cap 36 may include a circular top wall 50 coupled to a hollow cylindrical side wall 52 that is generally positioned within the body 34. The top wall 50 includes an upper surface upon which the user presses to push the pushbutton 18.

The spring 38 is located between the top wall 50 of the cap 36 and the disc 46 of the body 34. The spring 38 generally urges the cap 36 to remain in an up, or separated, position when the pushbutton 18 is not being pushed.

The plunger 40, as shown in FIGS. 7, 8, 10, and 11, may include a first shaft 54 with a hollow cylindrical shape and a threaded internal surface and a second shaft 56 with a solid cylindrical shape and a threaded external surface. The plunger 40 may further include a head 58 coupled to one end of the second shaft 56. Typically, the head 58 is formed from electrically conductive material, i.e., a metal or metal alloy. In exemplary embodiments, the second shaft 56 and the head 58 in combination are formed by a metal screw. The second shaft 56 is generally positioned within, and rotatably coupled to, the first shaft 54. The length of the plunger 40 is variable and may be adjusted by rotating the head 58, which changes the axial position of the second shaft 56 in relation to the first shaft 54. Other embodiments may use a button post with e-clip groove to retain the button, the button post being inductively sensed.

The free end of the plunger 40 is coupled to a center of a lower surface of the top wall 50 of the cap 36 and extends outward therefrom so that the head 58 of the plunger 40 opposes the cap 36. Pushing or pressing on the cap 36 (actions taken in order to push the pushbutton 18) causes axial motion of the plunger 40. The axial position of the head 58 is variable and may be adjusted by rotating the head 58.

In exemplary embodiments, the wearable electronic device 10 includes five pushbuttons 18A, 18B, 18C, 18D, 18E, each of which is coupled to the side wall 28 of the housing 16. Specifically, each pushbutton 18 is positioned in, and retained by, a successive one of the recesses 32 in the side wall 28. Each pushbutton 18 may be threadably coupled, or otherwise rigidly attached, to its associated recess 32. However, each pushbutton 18 may present any configuration suitable for detection by the sensors 20. Thus, for instance, each pushbutton 18 may comprise any shape or physical arrangement where its movement may be sensed by the sensors 20. The pushbutton 18 may be entirely comprised of metal, may be partially comprised of metal, or may be formed of other electrically-conductive materials suitable for detection by the sensors 20.

Figure 7:
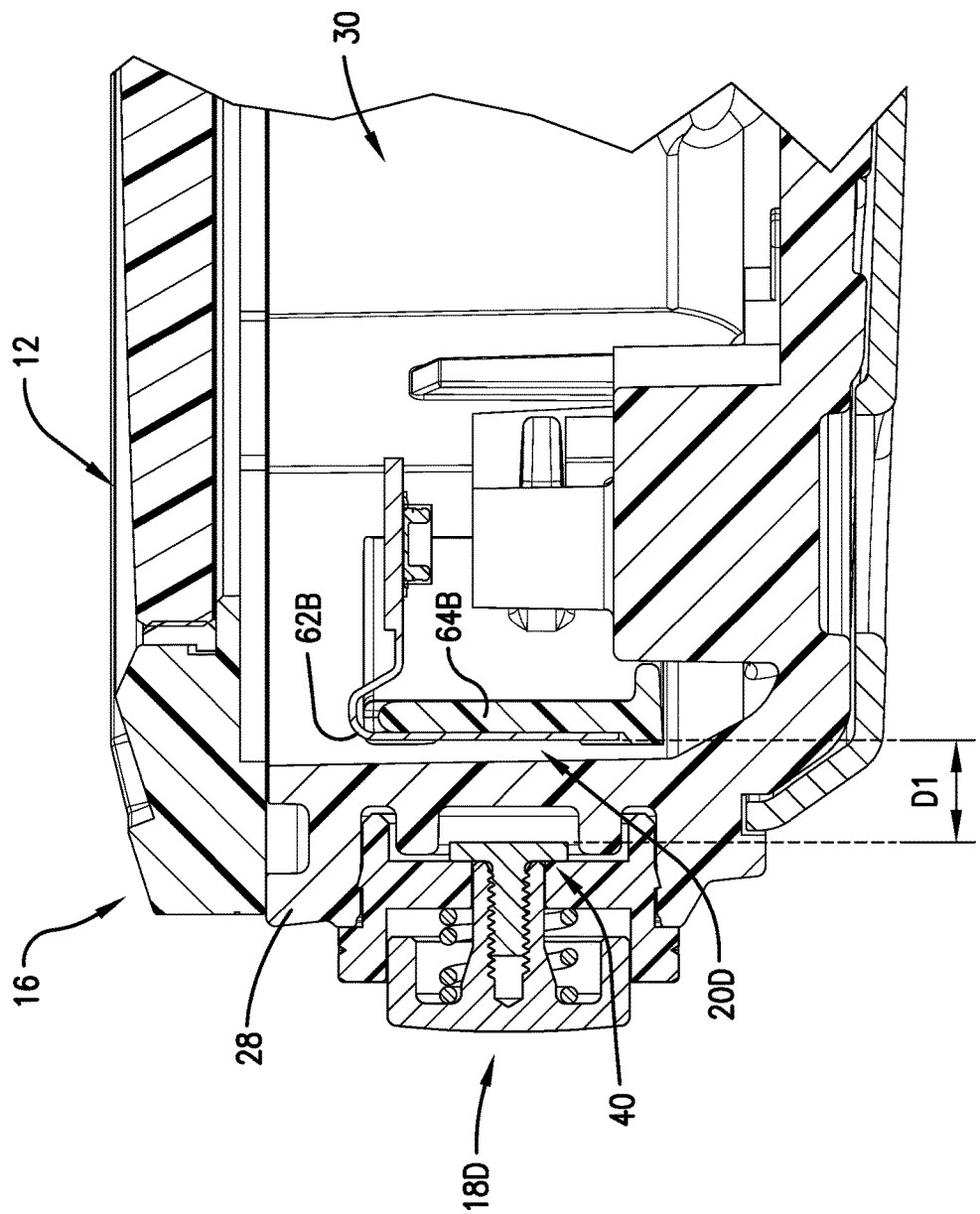
FIG. 7 is a sectional view of a portion of the wearable electronic device cut along a vertical plane through one pushbutton and the side wall of the housing.
Figure 8:
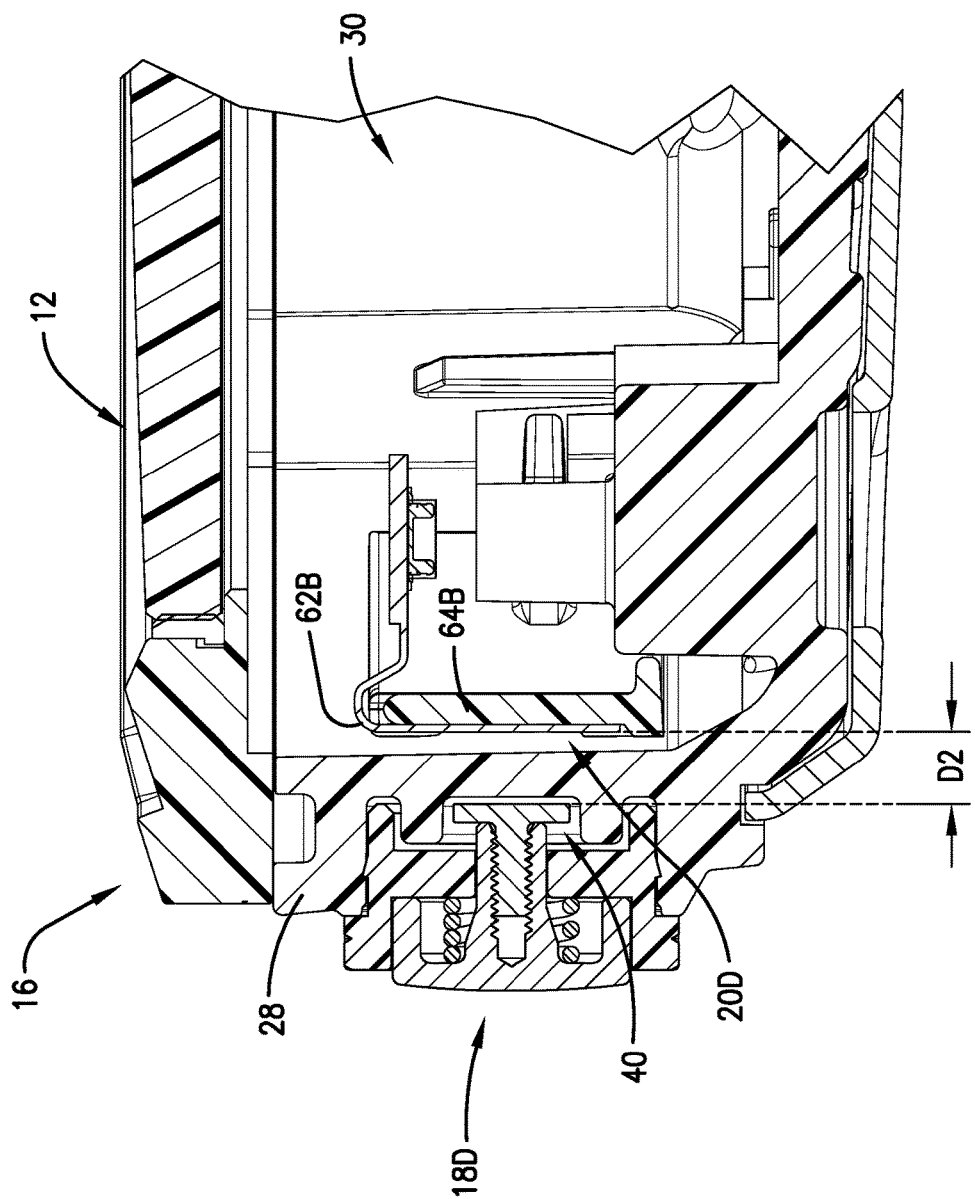
FIG. 8 is a sectional view of the portion of the wearable electronic device of FIG. 7 with the pushbutton being pushed.
Figure 9:
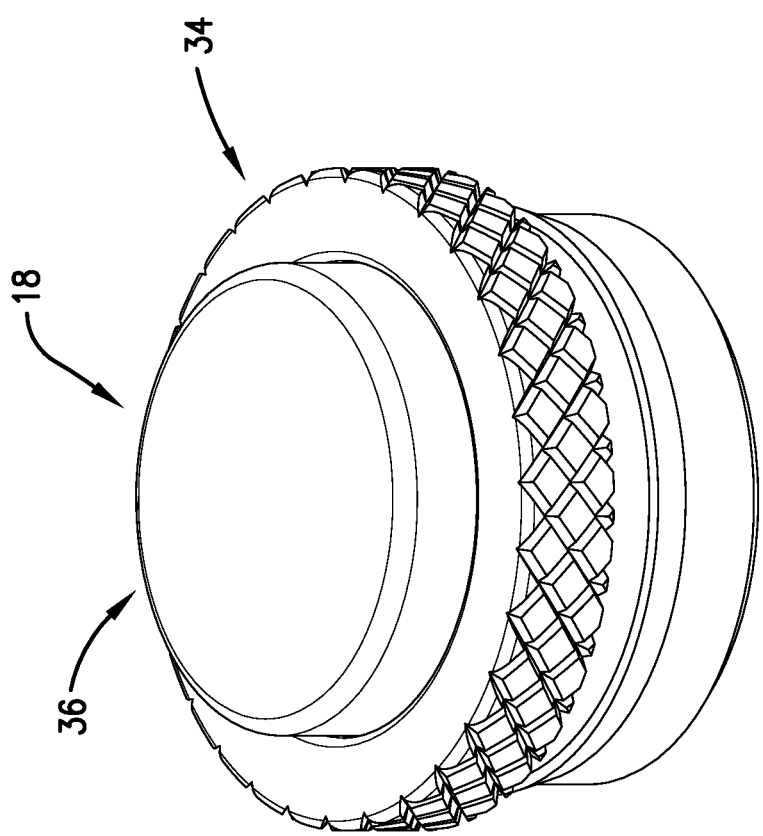
FIG. 9 is a top perspective view of one pushbutton.
Figure 10:
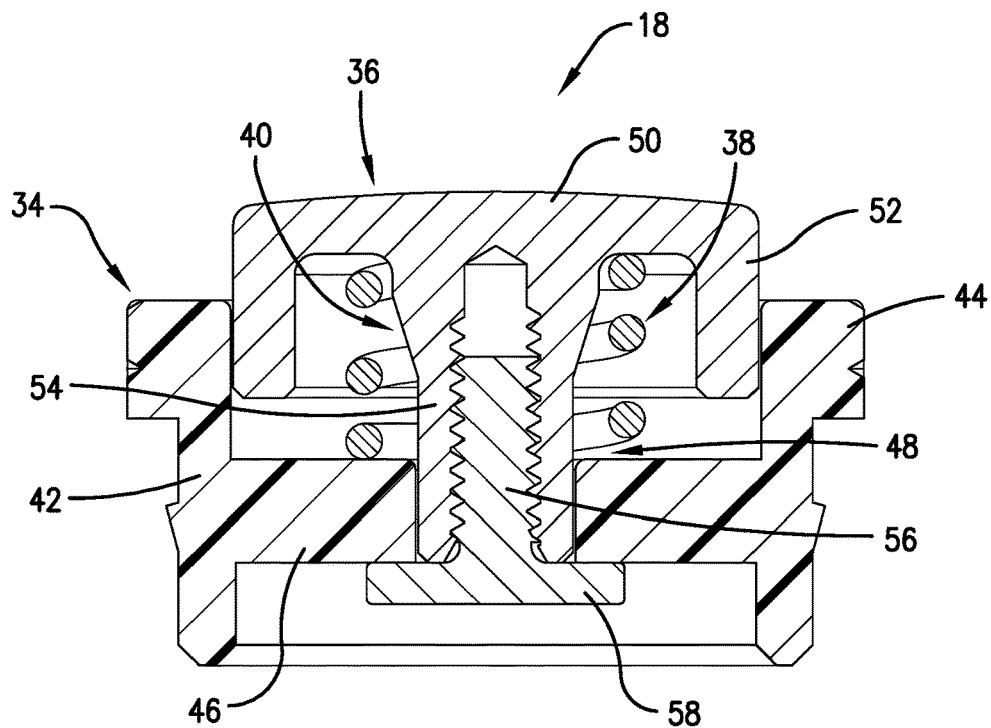
FIG. 10 is a sectional view of the pushbutton of FIG. 9 cut along a vertical plane.
Figure 11:
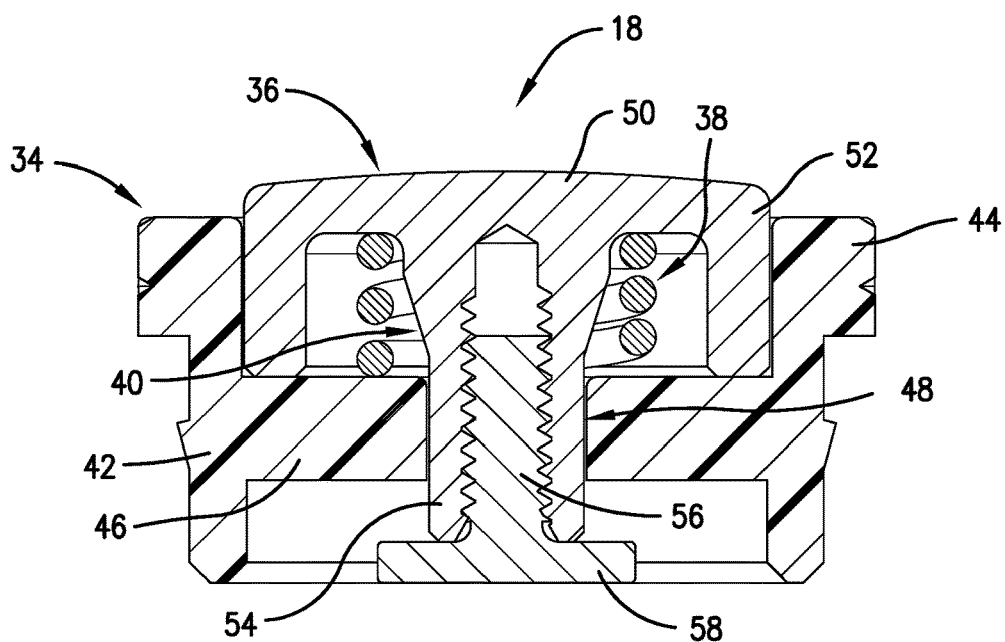
FIG. 11 is a sectional view of the pushbutton of FIG. 10 with the pushbutton being pushed.

The pushbuttons 18 in their default, non pushed state are shown in FIGS. 1, 2, 5-7, and 10. The pushbuttons 18 when pushed are shown in FIGS. 8 and 11.

Figure 13:
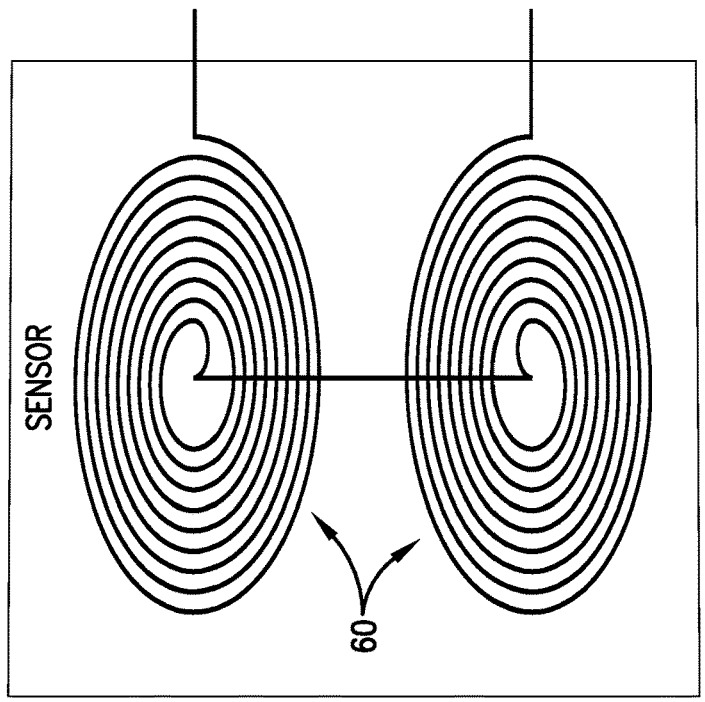
FIG. 13 is a schematic view of the sensor including two coils.
Figure 12:
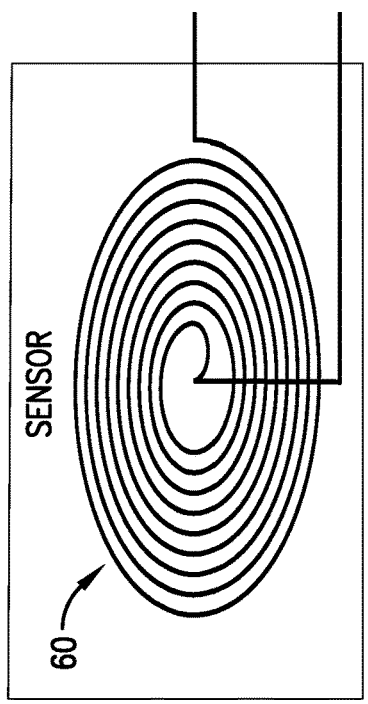
FIG. 12 is a schematic view of a sensor of the wearable electronic device, the sensor including one coil.

The sensors 20, as shown in FIGS. 12-16, may sense the position of a plunger 40 of an associated pushbutton 18 in order to determine when the pushbutton 18 has been pushed. Thus, in exemplary embodiments, the wearable electronic device 10 includes five sensors 20A, 20B, 20C, 20D, 20E, with each sensor 20 configured to sense the position of the plunger 40 of a successive one of the pushbuttons 18. Each sensor 20 includes an electrically conductive element 60 through which electric current of a sensing electronic signal flows. The conductive element 60 is typically embodied by, or includes, an inductive coil. The shape of the coil may vary according to, or be determined by, the function of the sensor 20. For example, sensors 20 that sense axial distance may have a generally planar, spiral shaped coil. Sensors 20 that sense lateral distance (parallel to the plane of the sensor 20) may have a quadrilateral, typically square or rectangular, shaped coil. In some embodiments, the conductive element 60 may include a single coil, as shown in FIG. 12. In other embodiments, the conductive element 60 may include two (or more) coils with one coil overlaying the other coil such that the two coils are concentrically aligned, as shown in FIG. 13. In addition, the coils are oriented such that the rotation of one opposes the rotation of the other. Furthermore, each coil may include a center terminal and an edge terminal. The center terminal of one coil is electrically connected to the center terminal of the other coil. This allows the sensing electronic signal to flow through both coils.

Each sensor 20 has an inductance value and a series resistance value. While the sensor 20 has electric current of the sensing electronic signal flowing through it, the inductance value and the series resistance value may each change when an electrically conductive object, such as the plunger 40 of a pushbutton 18, is brought within close proximity to the sensor 20. Thus, the electrical characteristics of sensor 20 are modified by its distance to the plunger 40. The values of the inductance and the series resistance may each vary according to, or may be a function of, an axial distance between the object and the sensor 20. Thus, for instance, sensor 20 can detect movement of the pushbutton 18 towards and/or away from the sensor 20.

Each sensor 20 may be implemented, or positioned, on an insulating or dielectric substrate 62, as shown in FIGS. 7, 8, 14, and 15. In exemplary embodiments, the substrate 62 may be embodied by flexible circuitry, also known as "flex", which broadly includes flexible thin polymer films on which electrically conductive traces and/or electrical components may be placed and routed. Alternatively, the substrate 62 may be embodied by rigid printed circuit boards, ceramic layer technology, laser direct structuring, laser selective plating, etc. Coils of insulated wire could also be used. In exemplary embodiments, the wearable electronic device 10 includes two substrates 62A, 62B, with each substrate 62 configured to retain a plurality of sensors 20, as shown in FIGS. 14 and 15.

The wearable electronic device 10 may further include a plurality of frames 64, with each frame 64 configured to retain one of the substrates 62, as shown in FIGS. 14 and 15. In exemplary embodiments, the wearable electronic device 10 includes two frames 64A, 64B. Each frame 64 is formed from rigid, electrically insulating materials, such as hardened plastics, conductive metal, and/or metal alloys. Each frame 64 may include a single wall of generally rectangular shape, although some frames 64 may include additional walls or present any geometric shape. Each frame 64 may include a curvature along its length that generally matches the curvature of the side wall 28 of the housing 16. In addition, each frame 64 may include a recess on an outer surface configured to retain one substrate 62. The recess may be shaped to match the shape of the substrate 62 it is to retain. Pins or other locating features may also be utilized. The frames 64 may be coupled to the bottom wall 26 of the housing 16 adjacent to the inner surface of the side wall 28 in the vicinity of the recesses 32 and the pushbuttons 18 on the outer surface of the side wall 28. The bottom wall 26 may include fixtures, slots, channels, or other features to which the frames 64 are coupled. Each sensor 20 is positioned on its substrate 62, each substrate 62 is positioned on its frame 64, and each frame is positioned within the housing 16, such that the center of each sensor 20 is generally axially aligned with its associated pushbutton 18. In addition, the axis of each pushbutton 18 is generally surface normal to the plane of its associated sensor 20. In some configurations, inner sidewall features may be utilized to retain substrates 62 without requiring use of the frames 64. Thus, substrate 62 may be accurately positioned using various methods and device 10 may lack frames 64. For instance, in some configurations, substrates 62 may be mounted directly to side wall 28. In embodiments employing laser direct structuring or laser selective plating, sensor coils can be plated directly to frame 64 and/or side wall 28.

The processing element 22 may comprise one or more processors. For example, in some configurations, processing element 22 includes a first processor to detect button pushes, which communicates button push signals to a second processor. The processing element 22 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, code statements, software, firmware, programs, applications, apps, processes, services, daemons, or the like. The processing element 22 may also include hardware components such as registers, finite-state machines, sequential and combinational logic, and other electronic circuits that can perform the functions necessary for the operation of the current invention. In certain embodiments, the processing element 22 may include multiple computational components and functional blocks that are packaged separately but function as a single unit. The processing element 22 may also include one or more arithmetic logic units 66 configured to perform calculations, computations, and the like, such as mathematical operations as well as logical operations and comparison operations. The processing element 22 may be in electronic communication with the other electronic components through serial or parallel links that include universal busses, address busses, data busses, control lines, and the like. The processing element 22 may be operable, configured, or programmed to perform the functions described herein by utilizing hardware, software, firmware, or combinations thereof. Processing element 22 may additionally include a power supply such as a battery or the like to power device 10.

The processing element 22 may further include, or be in electronic communication with, a plurality of converter circuits 68. Each converter circuit 68 may be configured to generate a sensing electronic signal, receive the sensing electronic signal back, and detect a value or a level of one or more electrical characteristics, such as electric voltage, electric current, electrical resistance, and/or electrical inductance, of the received sensing electronic signal. The sensing electronic signal may be an alternating current (AC) periodic electronic signal. Each converter circuit 68 may be further configured to output a characteristic electronic signal that includes a digital data value which corresponds to, and varies with, the electrical characteristic detected from the received sensing electronic signal. An exemplary converter circuit 68 may be provided by the LDC211x (e.g., LDC2114 and/or LDC2112) integrated circuit devices manufactured by Texas Instruments of Dallas, Tex. In exemplary embodiments shown in FIG. 16, the wearable electronic device 10 includes five converter circuits 68A, 68B, 68C, 68D, 68E, with each converter circuit 68 configured to interface with a successive one of the sensors 20. In configurations, two LDC211x devices may provide the five circuits 68A, 68B, 68C, 68D, 68E.

Figure 16:
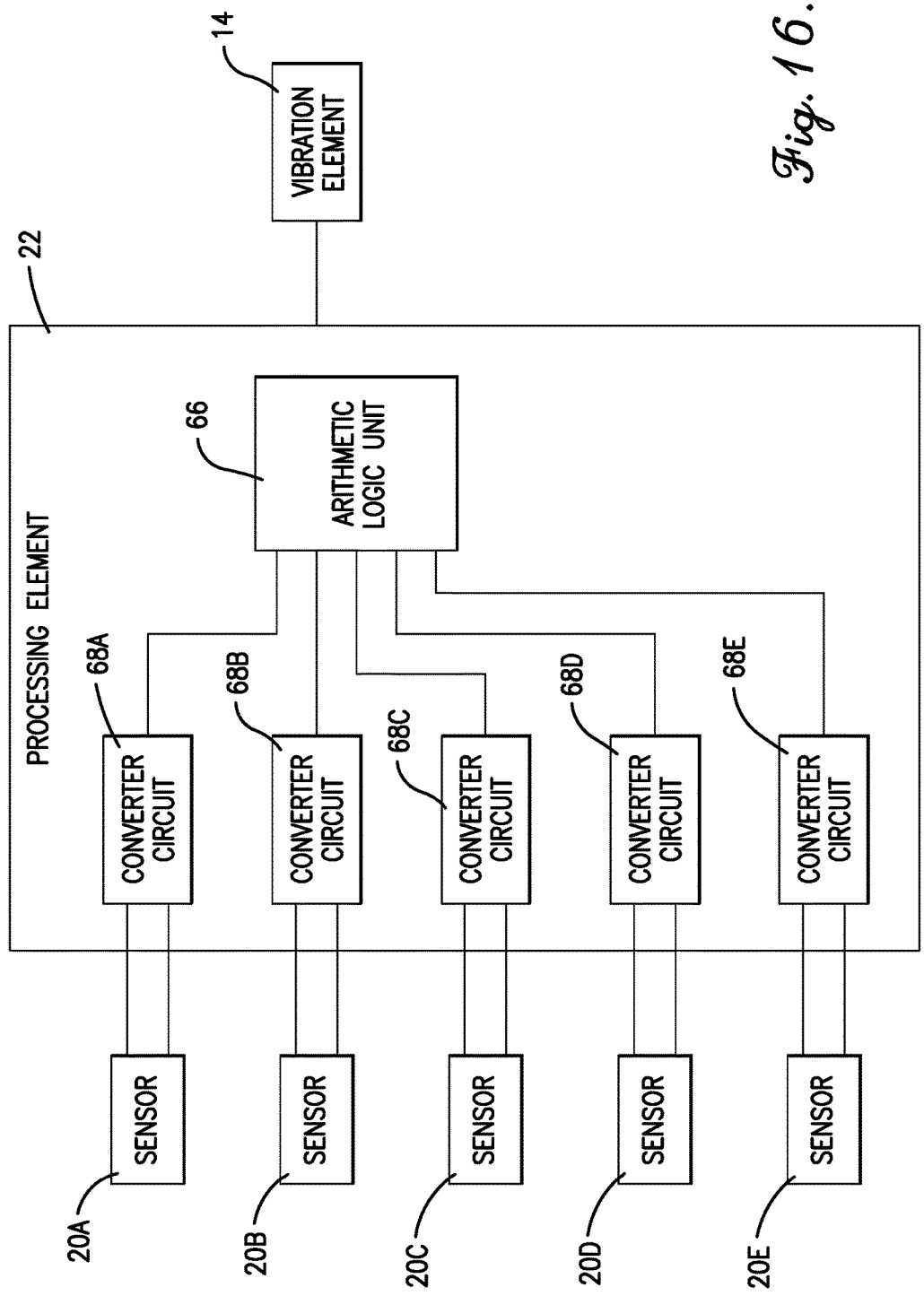
FIG. 16 is schematic block diagram of various electronic components of the wearable electronic device.

With reference to FIG. 16, the processing element 22 may operate as follows. Each converter circuit 68 generates one sensing electronic signal which is received by an associated one of the sensors 20. The converter circuit 68 receives the sensing electronic signal back after it flows through the sensor 20. The converter circuit 68 may detect one or more electrical characteristics of the sensing electronic signal. In turn, the converter circuit 68 outputs the characteristic electronic signal that includes a digital data value which corresponds to the electrical characteristic. The arithmetic logic unit 66 receives a plurality of characteristic electronic signals, one characteristic electronic signal from each converter circuit 68. For each characteristic electronic signal, the arithmetic logic unit compares the data value included therein to a detection threshold value indicating a button push. If the characteristic electronic signal data exceeds the detection threshold value (or otherwise corresponds to one or more values or ranges of values)(, then the arithmetic logic unit 66 determines that the pushbutton 18 associated with the sensor 20 and the converter circuit 68 which output the characteristic electronic signal has been pushed. Upon determination of any of the pushbuttons 18 being pushed, the processing element 22 may generate the vibration electronic signal which is received by the vibration element 14 and/or provide various functionality associated with the device 10. In configurations, arithmetic logic unit 66 and converter circuit 68 may be integrated into the same package and/or comprise a portion of the same device. For instance, the LDC2114 described above may provide both the converter circuits 68 and arithmetic logic unit 66. Additionally, functions of the processing unit 22, arithmetic logic unit 66, and converter circuit 68 may be integrated into the same package and/or comprise a portion of the same device. For instance, each LDC2114 described above may additionally include processing functionality to enable it to determine whether one or more pushbuttons 18 have been depressed and send an interrupt signal to another processor responsible for other functionality of device 10. Thus, in configurations, the LDC2114 comprise a first processor of processing element 22 while other processors of processing element 22 provide other functionality such as control of the vibration element 14.

The wearable electronic device 10 may operate as follows. One pushbutton 18, one sensor 20, and one converter circuit 68 are each associated with one another. Each converter circuit 68 generates one sensing electronic signal which is received by its associated sensor 20. The sensing electronic signal flows through the sensor 20 and returns to the converter circuit 68. Without the associated pushbutton 18 being pushed, one or more electrical characteristics of the sensing electronic signal (resulting from one or more electrical characteristics of the sensor 20) are at a first level, considered a default level. The converter circuit 68 detects the one or more electrical characteristics and outputs the characteristic electronic signal that includes a digital data value, considered a default data value, which corresponds to the one or more electrical characteristics. The arithmetic logic unit 66 receives the characteristic electronic signal, compares its data to the range of values indicating a button push, and, given the default value of the data, determines that the associated pushbutton 18 has not been pushed.

The user may push or press the pushbuttons 18 to perform various functions. Pushing one of the pushbuttons 18 causes axial motion of the plunger 40 of the pushbutton 18 toward the associated sensor 20. The presence of the plunger 40 in proximity to the sensor 20 changes electrical characteristics, such as electrical inductance and/or electrical resistance, of the sensor 20. The change varies according to, or as a function of, the axial distance between the plunger 40, specifically the head 58, and the sensor 20. The range of the axial distance between the plunger 40 of pushbutton 18D and the sensor 20D is illustrated in the figures. In FIG. 7, the pushbutton 18D is not pressed, resulting in the axial distance being at its greatest value D1. In FIG. 8, the pushbutton 18D is pressed, resulting in the axial distance being at its lowest value D2.

The change in electrical characteristics of the sensor 20 results in a change in electrical characteristics of the sensing electronic signal. The converter circuit 68 detects the electrical characteristics and outputs the characteristic electronic signal with digital data that corresponds to the electrical characteristics. The value of the data in the characteristic electronic signal changes as the plunger 40 gets closer to the sensor 20. The arithmetic logic unit 66 receives the characteristic electronic signal and compares its data to the range of values indicating a button push. When the characteristic electronic signal data value is within the range, the arithmetic logic unit 66 determines that the associated pushbutton 18 has been pushed. In some configurations, button depression detection occurs when a detection threshold value is exceeded. A plurality of thresholds may be employed to operate different functions based on button depression amount (e.g., partial depression triggers a first device function while full depression triggers a second device function).

Upon determination that one of the pushbuttons has been pushed, the processing element 22 generates the vibration electronic signal. The vibration element 14 receives the vibration electronic signal and momentarily vibrates the housing 16—indicating to the user that the wearable electronic device 10 has detected his button push.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A wearable electronic device comprising:
   a housing including
      a bottom wall configured to contact a wearer's body,
      a side wall coupled to the bottom wall, and
      a sealed internal cavity formed in part by the bottom wall and the side wall;
   a pushbutton coupled to an outer surface of the side wall, the pushbutton including a plunger configured to move in relation to the side wall when the pushbutton is pushed;
   a sensor positioned in the internal cavity adjacent to an inner surface of the side wall, the sensor including a conductive element through which an electronic signal is operable to flow, the sensor configured to modify an electrical characteristic of the electronic signal according to a distance between the plunger and the conductive element; and
   a processing element configured to receive the electronic signal from the sensor and to process the electronic signal to determine when the pushbutton is pushed.

2. The wearable electronic device of claim 1, wherein the processing element includes a converter circuit configured to receive the electronic signal and to generate a data output whose value varies according to the electrical characteristic of the electronic signal.

3. The wearable electronic device of claim 2, wherein the processing element is further configured to receive the data output and to determine that the pushbutton has been pressed when the value of the data output exceeds a detection threshold value indicating a button push.

4. The wearable electronic device of claim 1, wherein the conductive element includes a coil.

5. The wearable electronic device of claim 1, wherein the conductive element includes
a first coil wound in a first direction, and
a second coil concentric with the first coil, electrically connected to the first coil and wound in a second direction opposite to the first direction.

6. The wearable electronic device of claim 1, wherein the conductive element has an inductance value that varies according to a distance between the plunger and the conductive element.

7. The wearable electronic device of claim 1, wherein the conductive element has a series resistance value that varies according to a distance between the plunger and the conductive element.

8. The wearable electronic device of claim 1, wherein the plunger is constructed from electrically conductive material.

9. The wearable electronic device of claim 1, wherein the side wall is constructed from electrically non-conductive material.

10. The wearable electronic device of claim 1, wherein the sensor is axially aligned with the plunger.

11. The wearable electronic device of claim 1, further comprising a flexible substrate on which the sensor is implemented and a rigid frame retaining the substrate.

12. The wearable electronic device of claim 11, wherein the frame is positioned in the internal cavity adjacent to the side wall.

13. The wearable electronic device of claim 1, wherein the side wall of the housing includes a recess in which the pushbutton is retained.

14. The wearable electronic device of claim 1, further comprising a vibration element configured to vibrate the housing upon receipt of a vibration electronic signal and wherein the processing element is further configured to generate the vibration electronic signal when it determines the pushbutton is pressed.

15. A wearable electronic device comprising:
a housing including
a bottom wall configured to contact a wearer's body,
a side wall coupled to the bottom wall, and
a sealed internal cavity formed in part by the bottom wall and the side wall;
a pushbutton coupled to an outer surface of the side wall, the pushbutton including a plunger configured to move axially toward the side wall when the pushbutton is pushed;
a sensor positioned in the internal cavity adjacent to an inner surface of the side wall, the sensor including at least one coil axially aligned with the plunger and through which an electronic signal is operable to flow, the sensor configured to modify an electrical characteristic of the electronic signal according to a distance between the plunger and the coil; and
a processing element including a converter circuit configured to receive the electronic signal from the sensor and to generate a data output whose value varies according to the electrical characteristic of the electronic signal,
wherein the processing element is configured to receive the data output and to determine that the pushbutton has been pressed when the value of the data output exceeds a detection threshold value indicating a button push.

16. The wearable electronic device of claim 15, wherein the sensor includes
a first coil wound in a first direction, and
a second coil concentric with the first coil, electrically connected to the first coil and wound in a second direction opposite to the first direction.

17. The wearable electronic device of claim 15, wherein the conductive element has an inductance value that varies according to a distance between the plunger and the conductive element and a series resistance value that varies according to a distance between the plunger and the conductive element.

18. The wearable electronic device of claim 15, wherein the plunger is constructed from electrically conductive material and the side wall is constructed from electrically non-conductive material.

19. The wearable electronic device of claim 15, further comprising a flexible substrate on which the sensor is implemented and a rigid frame retaining the substrate, wherein the frame is positioned in the internal cavity adjacent to the side wall.

20. A wearable electronic device comprising:
a housing including
a bottom wall configured to contact a wearer's body,
a side wall coupled to the bottom wall, and
a sealed internal cavity formed in part by the bottom wall and the side wall;
a plurality of pushbuttons coupled to an outer surface of the side wall, each pushbutton including a conductive plunger configured to move axially toward the side wall when the pushbutton is pushed;
a plurality of sensors positioned in the internal cavity adjacent to an inner surface of the side wall, each sensor associated with a successive one of the pushbuttons, each sensor including at least one coil axially aligned with the plunger of its associated pushbutton and through which one of a plurality of electronic signals is operable to flow, each sensor configured to modify an electrical characteristic of its electronic signal according to a distance between the plunger of its associated pushbutton and its coil; and
a processing element including a plurality of converter circuits, each converter circuit associated with a successive one of the sensors, each converter circuit configured to receive the electronic signal from the sensor and to generate one of a plurality of data outputs, each of whose value varies according to the electrical characteristic of the electronic signal,
wherein the processing element is configured to receive the data outputs and to determine that one pushbutton has been pushed when the value of the data output of its associated converter circuit exceeds a detection threshold value indicating a button push.

\* \* \* \* \*